MULTIVARIATE INTERPOLATING FUNCTION GENERATORS

Filed Feb. 7, 1963 3 Sheets-Sheet 1

INVENTOR

Amos Nathan

INVENTOR
Amos Nathan

July 19, 1966 A. NATHAN 3,261,971

MULTIVARIATE INTERPOLATING FUNCTION GENERATORS

Filed Feb. 7, 1963 3 Sheets-Sheet 3

INVENTOR

United States Patent Office 3,261,971
Patented July 19, 1966

3,261,971
MULTIVARIATE INTERPOLATING FUNCTION GENERATORS
Amos Nathan, Dept. of El. Engg., Technion, Israel Inst. of Technology, Haifa, Israel
Filed Feb. 7, 1963, Ser. No. 256,867
7 Claims. (Cl. 235—197)

This invention relates to multivariate interpolating function generators. More specifically, this invention relates to devices which establish function values, given at the grid points of a multidimensional regular grid, said function values being independently adjustable, and which generate an output signal which is equal to the piecewise linear interpolation over the stored function values, when fed with signals representing the co-ordinates of the point at which the interpolated function value is required, said co-ordinates corresponding to the variable. This invention relates only to the case of two or more variables.

This application is a continuation-in-part of my prior copending application No. 801,469, filed March 24, 1959, now abandoned.

One example of the use of such function generators is in conjunction with analog computers. In such computers it is desirable that a function generator be easily adjustable to enable it to generate different functions.

The prior art provides adjustable function generators of one variable in which the produced function is obtained by adding a plurality of "triangle functions," one each being associated with a given function value. Such function generators are described, for example, in my joint co-pending applications U.S. Serial No. 837,614, filed September 2, 1959, now U.S. Patent No. 3,100,839, and the corresponding U.K. convention application No. 27,598/60, as well as in my joint co-pending U.S. application Serial No. 837,619, filed September 2, 1959, now U.S. Patent No. 3,120,605, and the corresponding U.K. convention application No. 27,597/60.

The prior art does not teach how to implement function generators, having the advantages of said function generators of one variable, in the case of more than one variable.

It is an object of the invention to provide function generators for two or more variables which have the advantages of easy and independent adjustment similar to said generators of functions of one variable.

A further object of this invention is the adaptation of a plurality of triangle generators for the generation of functions of two or more variables.

A yet further object of this invention is the provision of means for the electronic implementation of the piecewise-linear interpolation of function values given at the grid points of a regular grid of two or more dimensions such that the readjustment of any one grid point function value does not require the readjustment of circuits associated with any other grid point.

It is also an object of this invention to provide means for the implementation of the piecewise linear interpolation of function values given over a regular multidimensional grid of two or more dimensions in a novel circuit configuration.

Another object of the invention is the implementation of such interpolation in an electronic circuit, by taking advantage of the special properties of the interpolation function in the case of a regular grid, such that not more than $n\cdot(n+1)/2$ diodes are required per grid point in addition to a number of diodes linearly dependent on the number of different grid point values given for each variable, where $n$ denotes the number of independent variables, i.e. the dimension of the function.

Yet another object of this invention is the provision of an interpolation function generator which is symmetrical in all co-ordinates.

The theory of interpolation which is made use of in the present invention has been stated and proved in my paper, "Simplicial Coordinates and Piecewise-Linear Interpolation in a Regular $n$-Dimensional Lattice," Journal of Mathematics and Physics, vol. 39, No. 3, October 1960, pp. 198–210.

I shall first recite the results of said paper for the case $n=2$, i.e. for the case of two independent variables. The two independent variables will be denoted by $x_{01}$ and $x_{02}$, respectively. A third variable is produced through the relation $$x_{12}=x_{02}-x_{01}$$

$x_{12}$ thus depends in a linear manner upon the two independent variables. A triangle function is defined by $$\Delta_1^o(x)=1-\text{Min }(|x|, 1)=\text{Max }(1-|x|, 0)$$

where Min is a selection operator, selecting the least of the quantities upon which it operates. A delta function is defined by $$\Delta_2^o(x_{01}, x_{02})=\text{Min }[\Delta_1^o(x_{01}), \Delta_1^o(x_{02}), \Delta_1^o(x_{12})]$$
$$=\text{Max }\{0, \text{Min }[1-|x_{01}|, 1-|x_{02}|, 1-|x_{12}|]\}$$

The superscript $o$ associated with said triangle and delta functions indicates that these are centred on the origin of the system of co-ordinates, where $x_{01}=x_{02}=0$. In order to obtain the expression for a delta function centred on any point $P_i$ whose co-ordinates are $$r_{01}=x_{01}$$
$$r_{02}=x_{02}$$
$$r_{12}=x_{12}$$

it is necessary to substitute $(x_{01}-r_{01})$, $(x_{02}-r_{02})$, $(x_{12}-r_{12})$ for $x_{01}$, $x_{02}$, $x_{12}$, respectively, in the above expressions. The above expressions apply moreover to a grid spacing of value one, i.e. the differences between successive values of co-ordinates at the grid points are unity. If the spacing is, more generally, $\Delta x$, said substituted expressions must be divided by $\Delta x$. Therefore, $$\Delta_2^{P_i}(P)=\Delta_2^o\left\{\left(\frac{x_{01}-r_{01}}{\Delta x}\right), \left(\frac{x_{02}-r_{02}}{\Delta x}\right)\right\}$$
$$=\text{Min }\left\{\Delta_1^o\left(\frac{x_{01}-r_{01}}{\Delta x}\right), \Delta_1^o\left(\frac{x_{02}-r_{02}}{\Delta x}\right), \Delta_1^o\left(\frac{x_{12}-r_{12}}{\Delta x}\right)\right\}$$

The interpolation theorem which is proved and recited as Equation 5 in the above paper states, as applied to $n=2$, $$F(P)=\sum_i f_i\Delta_2^{P_i}(P)$$

where the summation extends over all lattice points $P_i$. F(P) is the interpolation function for the instantaneous values of the variables, which correspond to point P; i.e. the co-ordinates of P are $x_{01}$, $x_{02}$. $f_i$ is the value of F(P) at point $P=P_i$. More explicitly, the interpolation formula can be written in this instance $$F(P)=F(x_{01},x_{02})$$
$$=\sum_{r_1r_2} f_{r_1r_2}\Delta_2^o\left\{\left(\frac{x_{01}-r_{01}}{\Delta x}\right), \left(\frac{x_{02}-r_{02}}{\Delta x}\right)\right\}$$

where $f_{r_1r_2}$ is the value of $f$ at point $P_i$ whose co-ordinates are $x_{01}=r_{01}$; $x_{02}=r_{02}$; and the summation extends over all values of $(r_{01}, r_{02})$.

More generally, the interpolation function is given by $$F(P)=\sum_i f_i\Delta_n^{P_i}(P)$$

where $n$ denotes the number of independent variables. The independent variables are $$x_{01}, x_{02}, x_{03} \ldots x_{0n}$$

and the dependent variables are derived therefrom with the aid of the relations $$x_{ij}=x_{0j}-x_{0i};\ i, j=1, 2 \ldots n$$

It is sufficient to derive those dependent variables for which $i<j$. Thus, for example, for $n=3$ the following dependent variables are required:

$$x_{12}, x_{13}, x_{23}$$

and for $n=4$ the following are required:

$$x_{12}, x_{13}, x_{14}, x_{23}, x_{24}, x_{34}$$

The $n$-dimensional delta function is defined by $$\Delta_n{}^o(P)=\Delta_n{}^o(x_{01}, x_{02} \ldots x_{0n})$$
$$=\text{Min}\ [\Delta_1{}^o(x_{01}), \Delta_1{}^o(x_{02}) \ldots \Delta_1{}^o(x_{0n}), \Delta_1{}^o(x_{12}) \ldots \Delta_1{}^o(x_{n-1,n})]$$

if centred on the origin, and more generally, if centred on grid point $P_1$ whose co-ordinates are $$x_{ij}=r_{ij};\ i, j=0, 1, 2 \ldots n;\ i<j;$$

and having a grid spacing of value $\Delta x$, $$\Delta_n{}^{P_1 o}(P)=\Delta_n{}^o\left[\frac{x_{01}-r_{01}}{\Delta x},\frac{x_{02}-r_{02}}{\Delta x} \ldots \frac{x_{0n}-r_{0n}}{\Delta x}\right]$$
$$=\text{Min}\left[\Delta_1{}^o\left(\frac{x_{01}-r_{01}}{\Delta x}\right) \ldots \Delta_1{}^o\left(\frac{x_{0n}-r_{0n}}{\Delta x}\right), \Delta_1{}^o\left(\frac{x_{12}-r_{12}}{\Delta x}\right) \ldots \Delta_1{}^o\left(\frac{x_{n-1,n}-r_{n-1,n}}{\Delta x}\right)\right]$$

This invention provides means for producing a function representing said delta functions. The invention also provides means for the production of the interpolation functions corresponding to the above expressions.

The invention will now be more particularly described in connection with the accompanying drawings in which FIGURES 1, 2, and 3 are a schematic diagram of one two-dimensional embodiment of a function generator of the invention;

Figure 7:
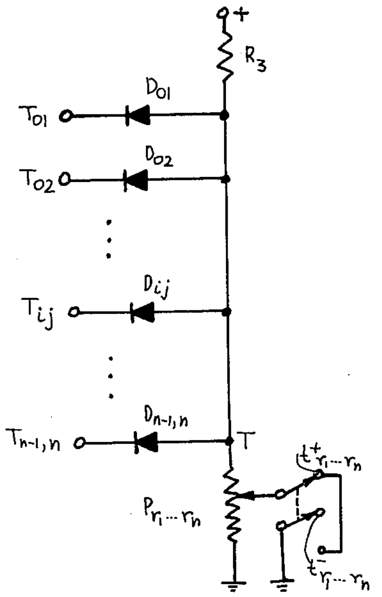

FIGURE 7 relates to a function generator of $n$ variables according to this invention.

Figure 1:
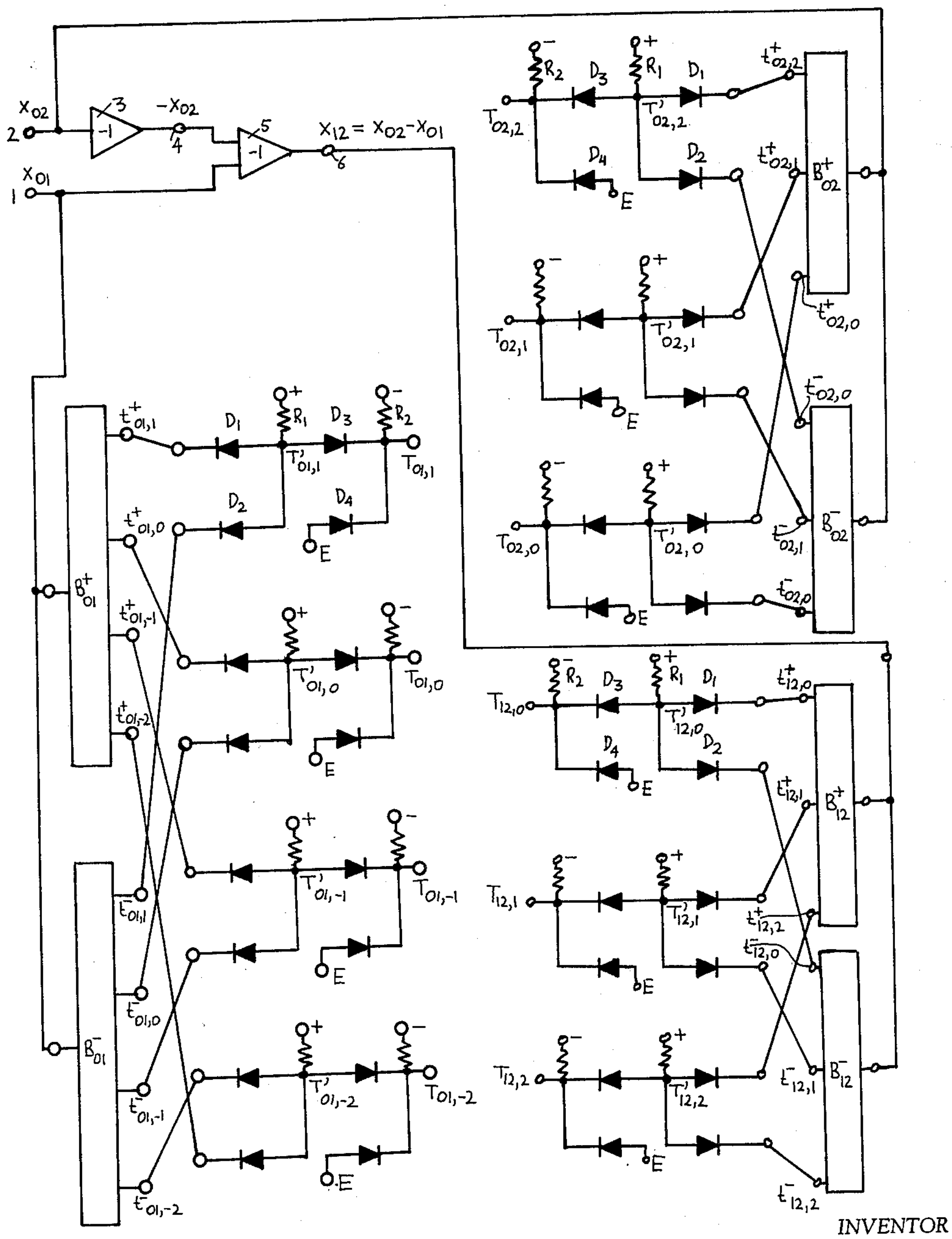
Figures 2, 3:
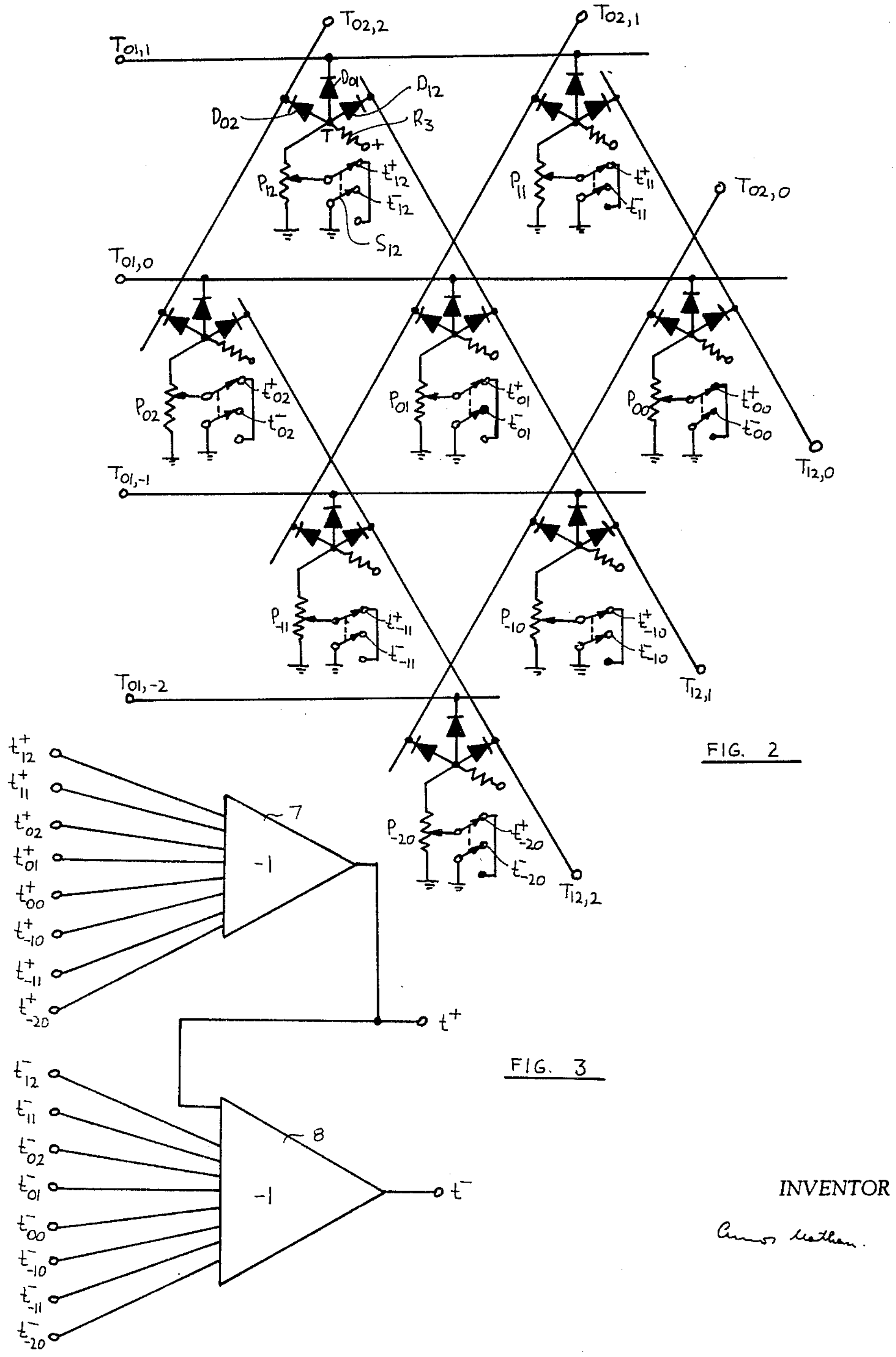

FIGURES 1, 2, and 3 relate to a function generator of variables $x_{01}$ and $x_{02}$. The grid point spacing is in this example $\Delta x=10$ volts. The grid point co-ordinates are given by $$(r_{01}, r_{02})=(-20, 0), (-10, 0), (-10, 10), (0, 0), (0, 10), (0, 20), (10, 10), (10, 20)$$

(all in volts). Therefore the values of $r_{12}$, computed by $r_{12}=r_{02}-r_{01}$, are, respectively, 20, 10, 20, 0, 10, 20, 0, 10. $r_{01}$, $r_{02}$ and $r_{12}$ thus assume the following values:

$$r_{01}=-20, -10, 0, 10$$
$$r_{02}=0, 10, 20$$
$$r_{12}=0, 10, 20$$

(all in volts).

In the example of FIGURE 1, voltages $x_{01}$ and $x_{02}$ are received at terminals 1 and 2, respectively. Sign changer 3 is connected to terminal 2 and produces at terminal 4 the voltage $-x_{02}$. Sign changing adder 5 is connected to terminals 1 and 4 and produces at its output terminal 6 the voltage $x_{12}=x_{02}-x_{01}$, which therefore represents the independent variable.

Next, voltages equal to $10-|x_{01}-r_{01}|$, $10-|x_{02}-r_{02}|$ and $10-|x_{12}-r_{12}|$ are produced, where $r_{01}$, $r_{02}$ and $r_{12}$ assume all the values listed above. For example, for $r_{01}=10$ volts, it is necessary to produce a voltage equal to $10-|x_{01}-10|$. Unit $B^+_{01}$ is connected to terminal 1 and produces at its output terminal $t^+_{01,1}$ the voltage $10+(x_{01}-10)=x_{01}$.

Similarly, unit $B^-_{01}$, also connected to terminal 1, produces at terminal $t^-_{01,1}$ the voltage $$10-(x_{01}-10)=20-x_{01}$$

Diodes $D_1$ and $D_2$ whose cathodes are connected to $t^+_{01,1}$ and $t^-_{01,1}$ respectively, have a common output connection at their anodes at terminal $T'_{01,1}$ to which a current is supplied through resistor $R_1$ which is connected to positive potential means at +. The diodes thus select the least of the voltages at their cathodes and the voltage produced at terminal $T'_{01,0}$ is equal to $$\text{Min}\ (10+(x_{01}-10), 10-(x_{01}-10))=10-|x_{01}-10|$$

as required.

Units $B^+_{01}$ and $B^-_{01}$ similarly produce at terminals $t^+_{01,0}$, $t^+_{01,-1}$, $t^+_{01,-2}$, $t^-_{01,0}$, $t^-_{01,-1}$, $t^-_{01,-2}$ the voltages $10+x_{01}$; $10+(x_{01}+10)$; $10+(x_{01}+20)$; $10-x_{01}$; $10-(x_{01}+10)$; $10-(x_{01}+20)$, respectively. Similar diode circuits produce at terminals $T'_{01,0}$, $T'_{01,-1}$, $T'_{01,-2}$ the voltages $10-|x_{01}|$; $10-|x_{01}+10|$; $10-|x_{01}+20|$; respectively.

At any terminal $T'_{ij,k}$ there has thus been produced the voltage $$\Delta x-|x_{ij}-r_{ij}|=\Delta x\cdot\left(1-\left|\frac{x_{ij}-r_{ij}}{\Delta x}\right|\right)$$

where $r_{ij}=k\cdot\Delta x$. Without loss of generality it is possible to simplify the notation by taking $\Delta x$ as the unit of voltage measurements, resulting in a voltage at $T'_{ij,k}$ that can be expressed in these units as $1-|x_{ij}-r_{ij}|$.

Diodes $D_3$ and $D_4$ whose anodes are connected to terminals $T'_{01,1}$ and E, respectively, have a common cathode connection at terminal $T_{01,1}$, from which current is withdrawn through resistor $R_2$ connected to negative potential means at −. These diodes thus produce by selection at $T_{01,1}$ a voltage equal to the greater of the voltages at their anodes. When the potential at E is equal to zero the voltage at terminal $T_{01,1}$ is therefore equal to $\text{Max}\ (1-|x_{01}-1|, 0)$ in units of $\Delta x$.

It will be shown that this is just one way of writing $\Delta_1{}^o(x_{01}-1)$. In fact, $$\text{Max}\ (1-|x|, 0)=\text{Max}\ (1-|x|, 1-1)$$
$$=1+\text{Max}\ (-|x|, -1)=1-\text{Min}\ (|x|, 1)$$

where the last step follows from the identity $$\text{Max}\ (-u, -v)=-\text{Min}\ (u, v)$$

applicable to any two real quantities $u$ and $v$. Substitution of $(x_{01}-1)$ for $x$ in the above results concludes the prove.

In these considerations the diodes have been considered as ideal in the sense that they either conduct current when they were assumed to have zero potential drop, or else they do not conduct any current. Actual diodes have a potential drop when conducting. Let us call this potential drop $e$. Diodes $D_1$, $D_2$, $D_3$, $D_4$ are arranged to have equal drop. The voltage thus produced at terminal $T'_{01,1}$ is greater by $e$ than stated previously. When diode $D_3$ is conductive the voltage at terminal $T_{01,1}$ is lower by $e$ than that at terminal $T'_{01,1}$ and when diode $D_4$ conducts and $D_3$ does not conduct it is lower by $e$ than that at terminal E. In order to eliminate the effect of offset voltage $e$, the voltage at terminal E is made equal to $+e$, and the effects of diode offset voltages are not carried over to terminal $T'_{01,1}$. If the diodes have not initially equal voltage drops, when conductive, it is always possible to compensate for this by the addition of small series resistor to the diodes.

Similar diode circuits produce at terminals $T_{01,0}$, $T_{01,-1}$, $T_{01,-2}$, $T_{02,2}$, $T_{02,1}$, $T_{02,0}$, $T_{12,0}$, $T_{12,1}$, $T_{12,2}$, the voltages, in units of $\Delta x$, $\Delta_1{}^o(x_{01})$, $\Delta_1{}^o(x_{01}+1)$, $\Delta_1{}^o(x_{01}+2)$, $\Delta_1{}^o(x_{02}-2)$, $\Delta_1{}^o(x_{02}-1)$, $\Delta_1{}^o(x_{02})$, $\Delta_1{}^o(x_{12})$, $\Delta_1{}^o(x_{12}-1)$, $\Delta_1{}^o(x_{12}-2)$, respectively. I.e., in general, at any terminal $T_{ij,k}$ there is the voltage $\Delta_1{}^o(x_{ij}-k)$, in units of $\Delta x$.

FIGURE 2 is the continuation of FIGURE 1. Terminals $T_{ij,k}$, where $i=0, 1$; $j=1, 2$; $k=-2, -1, 0, 1, 2$; are identical in FIGURES 1 and 2. Diodes $D_{01}$, $D_{02}$, $D_{12}$ having cathode connections at terminals $T_{01,1}$, $T_{02,2}$ and $T_{12,1}$, respectively, have a common anode connection at terminal T to which current is supplied through resistor $R_3$ connected to positive potential means at +. The voltage produced at terminal T thus corresponds to the least of the voltages at the cathode connections of said diodes, i.e. to Min $|\Delta_1^o(x_{01}-1), \Delta_1^o(x_{02}-2), \Delta_1^o(x_{12}-1)|$, which is equal to $\Delta_2^o(x_{01}-1, x_{02}-2)$, where $\Delta_2^o$ is as defined above. In other words, this voltage represents the $\Delta_2$ function centred on grid point (+1, +2)—all in units of $f_{r_1r_2}$.

Similar diode selection circuits produce voltages representing the functions $\Delta_2^o(x_{01}+2, x_{02})$; $\Delta_2^o(x_{01}+1, 0)$; $\Delta_2^o(x_{01}+1, x_{02}-1)$; $\Delta_2^o(x_{01}, x_{02})$; $\Delta_2^o(x_{01}, x_{02}-1)$; $\Delta_2^o(x_{01}, x_{02}-2)$; $\Delta_2^o(x_{01}-1, x_{02}-1)$; from selected voltages at terminals $T_{ij,k}$.

Next, these voltages are multiplied by quantities representing the values $f_{r_1r_2}$, at the respective grid points. In the example of FIGURE 3 this is accomplished in potential dividing means each of which stores one of the values of $f_{r_1r_2}$.

In order to obtain, for example, the required quantity associated with grid point $r_{01}=\Delta x$; $r_{02}=2\Delta x$, one terminal of potentiometer $P_{12}$ is connected to terminal T while the other terminal is connected to ground. The sliding contact of said potentiometer is connected either to terminal $t^+_{12}$ or to terminal $t^-_{12}$, depending upon the position of change-over switch $S_{12}$. The value of the voltage at the output terminal to which switch $S_{12}$ is connected is thus continuously adjustable between a maximum value of $\Delta_2^o(x_{01}-1, x_{02}-2)$ and zero. One such potentiometer and change-over switch is provided for each grid point and the produced voltages represent $f_{r_1r_2}\cdot\Delta_2^o[(x_{01}-r_{01}), (x_{02}-r_{02})]$ at terminals $t^+_{r_1r_2}$ or $t^-_{r_1r_2}$ depending upon the setting of the associated switch, $S_{r_1r_2}$.

FIGURE 3 is the continuation of FIGURE 2. All terminals labelled $t^+_{..}$ are connected to respective terminals with upper index + in FIGURE 2. Similarly all terminals $t^-_{..}$ in FIGURE 3 are connected to corresponding terminals in FIGURE 2. All $t^+_{..}$ terminals are input terminals to adder 7 which produces at terminal $t^+$ a voltage equal to the negative of the sum of the voltages at said input terminals. All $t^-_{..}$ terminals are input terminals to sign changing adder 8. Terminal $t^+$ is also connected to an input terminal of adder 8. Adder 8 thus produces at its output terminal $t^-$ an output voltage which is equal to the sum of the voltages at terminals $t^+_{..}$ minus the sum of the voltages at terminals $t^-_{..}$. Referring to the expression for $F(P)=F(x_{01}, x_{02})$ as given above, it is noted that the voltage at terminal $t^-$ represents F(P) for the instantaneous values of $x_{01}$ and $x_{02}$, where all variables and co-ordinates are measured in units of $\Delta x$.

Figure 4:
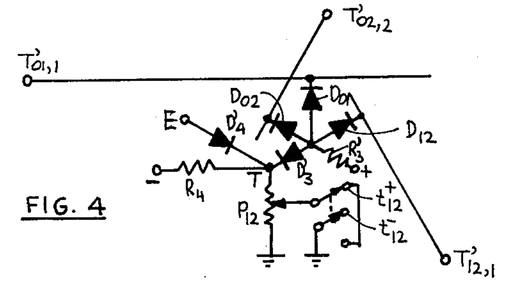
FIGURE 4 is a scrap schematic diagram illustrating an equivalent circuit.

FIGURE 4 is a scrap circuit diagram illustrating another, equivalent, way of carrying out the invention. Up to terminals $T'_{ij,k}$ the circuit of FIGURE 1 is employed. The roles of diodes $D_3$ and $D_4$ are taken over by diodes $D'_3$ and $D'_4$, respectively. One circuit as shown in FIGURE 4 must be associated with each grid point. It is evident that the circuits are equivalent; as far as signal selection is concerned they differ only in the sequence of selections and not in the final result.

Figure 5:
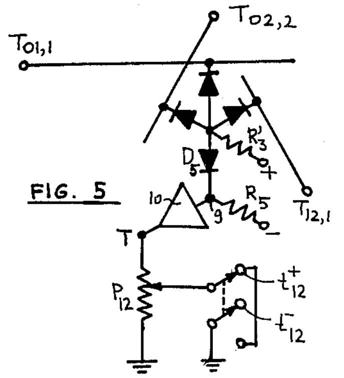
FIGURE 5 is a schematic diagram showing one method of diode offset voltage and drift compensation.

FIGURE 5 is a circuit diagram illustrative of one way of compensating for diode offset voltage and drift. In the above description of the circuit of FIGURE 2 the diodes were assumed to be ideal. If they have a voltage drop of value $e$ when conducting, the voltage produced at terminals T will be higher by $e$ than described. One way of compensating for this offset voltage consists in decreasing all voltages at terminals $t^+_{...}$ and $t^-_{...}$ and E in FIGURE 1 by $e$. Another method, which simultaneously compensates for diode drift, consists in the addition of diode $D_5$ in the signal path, as shown in FIGURE 5. Diode $D_5$ is held perpetually conductive by means of the current withdrawn from its anode through resistor $R_5$ which is connected to negative potential means at —.

FIGURE 5 also illustrates the use of an impedance converter in front of the potentiometer. It is advantageous to connect impedance converter 10 between output terminal 9 and potentiometer input terminal T in order not to load the preceding circuit. This permits the use of potentiometers having a lower resistance than otherwise possible. The impedance converter can consist of a cathode follower or of an emitter follower, for example.

Figure 6:
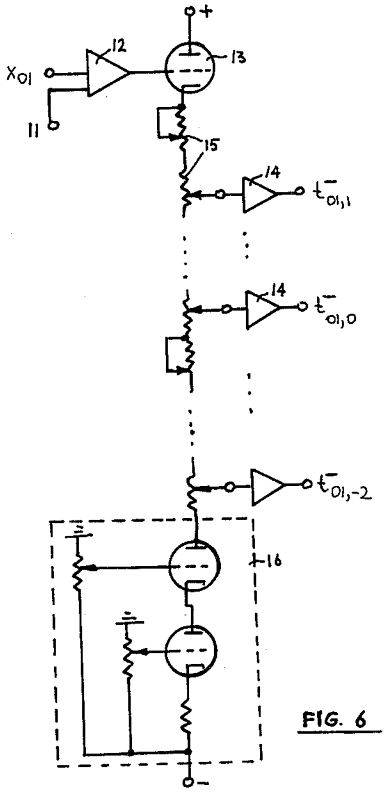
FIGURE 6 is a schematic diagram of one example of block $B^-_{01}$.

FIGURE 6 is a schematic diagram of one embodiment of block $B^-_{01}$ of FIGURE 1. Corresponding circuits for other blocks $B^+_{..}$ and $B^-_{..}$ follow from it in an obvious manner. Signal $x_{01}$ and a constant voltage at terminal 11 are linearly combined in sign changing adder 12 and whence transferred to the cathode of triode 13 which operates as a cathode follower. Constant current is withdrawn from resistor ladder 15 by constant current means 16. Output voltages are taken from suitable points along said ladder network, being first passed through impedance converters 14. Suitable impedance converters are provided by cathode followers, for example. More detailed information on this circuit is contained in said co-pending application Serial No. 837,614, now U.S. Patent No. 3,100,839, of August 13, 1963.

Other methods for the production of said triangle functions are described in said co-pending applications. In particular, compensation means described therein are used to advantage in connection with the present invention.

While the above specific example of an embodiment of the invention applies to a two-dimensional case, the implementation of the invention in the case of more than two dimensions will be quite clear in view of the above description taken in conjunction with the explicit expression of the $\Delta_n$ function and of the interpolation function F(P) given above. The production of said triangle functions proceeds in an exactly analogous way. Production therefrom of a $\Delta_n$ function can be accomplished in the circuit corresponding to FIGURE 7 in which terminals $T_{01}, T_{02} \ldots T_{ij} \ldots T_{n-1,n}$ each accept a corresponding triangle function. Diodes $D_{01} \ldots D_{n-1,n}$ select at their common anode connection at terminal T the least of said triangle functions. Potentiometer means and change-over means are identical to those described in connection with the two-dimensional embodiment of the invention. The adding and sign changing circuits are fed from a plurality of circuits, one per grid point, corresponding to FIGURE 7; they correspond to FIGURE 3 for any number of dimensions.

In one embodiment of the invention the following circuit elements and circuit values were used:

All diodes are silicon junction diodes.
All voltages marked + are 250 volts D.C.
All voltages marked — are —250 volts D.C.
Potentiometers $P_{...}$, 100 kilohms.
Resistors $R_1$, $R_2$, $R'_3$, 250 kilohms.
Resistors $R_3$, $R_4$, $R_5$, 500 kilohms.

Although this invention has been described and illustrated in detail, it is to be clearly understood that the same is by way of illustration and example only and is not to be taken by way of limitation, the scope of this invention being limited only by the terms of the appended claims.

What I claim is:

1. An interpolating function generator for use with an $n$-dimensional co-ordinate system having a plurality of grid points in the region of interest, comprising first means for introducing $n$ input signals, including first and second input signals, to the function generator, each of said input signals having a magnitude representing a variable in a separate one of said $n$ dimensions where $n$ is greater than one, second means for introducing to said function generator a plurality of first offset signals having predetermined constant magnitudes representing offsets of reference points in said co-ordinate system in said first one of said $n$ dimensions, third means for introducing to said function generator a plurality of second offset signals having predetermined constant magnitudes representing offsets of said reference points in said co-ordinate system in said second one of said $n$ dimensions, fourth means for receiving said first and second input signals and said first and second offset signals and for generating a plurality of first and second composite signals, each of said first and second composite signals having a magnitude which is a substantially linear function of one of said first and second input signals and of one of said first and second offset signals, fifth means responsive to said first and second input signals for generating a plurality of third composite signals each having a magnitude which is substantially equal to a linear function of a third variable and of one of a plurality of third offset quantities, wherein the magnitude of said third variable is substantially equal to the difference of said first and second variables and each of said third offset quantities is substantially equal to the difference between one of said plurality of first offset signals and one of said plurality of second offset signals, sixth means responsive to said first and second input signals for generating a plurality of fourth, fifth and sixth composite signals such that the respective sums of respective ones of said first and fourth, second and fifth and third and sixth composite signals are substantially constant, seventh means for accepting a constant signal, maximum and minimum selecting eighth means responsive to said plurality of composite signals and to said constant signal for making successive maximum and minimum selections therefrom and for generating a plurality of selected signals, whereby there is one of said selected signals per grid point, and means responsive to said plurality of selected signals for generating a final output signal having a magnitude substantially proportional to the desired function of said variables.

2. The function generator as recited in claim 1 wherein said eighth means includes a plurality of first selection means responsive to selected pairs of said first and fourth and second and fifth composite signals, respectively, for producing therefrom a plurality of first selected signals, each of said first selected signals having a magnitude which is a substantially linear function of the modulus of the difference between one of said variable representative signals and one of said offset signals.

3. The function generator as recited in claim 2 wherein said eighth means includes a plurality of second selection means responsive to said first selected signals and said constant signal for producing therefrom said plurality of selected signals, wherein each of said plurality of selected signals is substantially proportional to the greater of one of said first selected signals and said constant signal.

4. The function generator as recited in claim 3 wherein said final output producing means includes a plurality of means for establishing the value of said function at said reference points and for producing from said plurality of selected signals a plurality of first output signals the magnitude of each of which is substantially proportional to the value of said desired function at one of said grid points and to the magnitude of that one of said selected signals that is associated with the same grid point.

5. The function generator as recited in claim 4 wherein said final means includes a plurality of change-over means for establishing the sign of said function at said grid points.

6. The function generator as recited in claim 2 wherein said selection means comprises a plurality of diode means having groupwise common output connections.

7. The function generator as recited in claim 1 wherein said fifth means includes means for generating a third input signal whose magnitude represents said third variable, means for introducing to said function generator a plurality of third offset signals such that the magnitude of each of said third offset signals represents one of said third offset quantities, means for receiving said third input signal and said third offset signals for generating a plurality of third composite signals, each of said third composite signals having a magnitude which is a substantially linear function of said third input signal and of one of said third offset signals.

References Cited by the Examiner

UNITED STATES PATENTS

| | | | |
|---|---|---|---|
| 2,428,811 | 10/1947 | Rajchman | 235—197 |
| 2,797,865 | 7/1957 | Beattie et al. | 235—197 |
| 2,925,220 | 2/1960 | Serrell | 235—197 |
| 3,158,739 | 11/1964 | Herzog | 235—197 |

MALCOLM A. MORRISON, *Primary Examiner.*

K. W. DOBYNS, *Assistant Examiner.*